United States Patent
Jones

[11] Patent Number: 6,053,840
[45] Date of Patent: Apr. 25, 2000

[54] GEAR TRANSMISSION WITH AUTOMATIC CONTINUOUSLY VARIABLE MECHANICAL ADVANTAGE

[76] Inventor: Edward B. Jones, 1002 James Rd., Pelham, N.C. 27311

[21] Appl. No.: 09/218,695

[22] Filed: Dec. 22, 1998

[51] Int. Cl.$^7$ ................................................ F16H 48/06
[52] U.S. Cl. .......................... 475/338; 475/248; 475/339
[58] Field of Search .................................. 475/338, 339, 475/341, 248, 252

[56] References Cited

U.S. PATENT DOCUMENTS

| | | | |
|---|---|---|---|
| 1,688,194 | 10/1928 | Lyons | 475/248 |
| 2,223,413 | 12/1940 | Gasser | 475/339 |
| 2,231,784 | 2/1941 | Thungen | 475/339 X |
| 2,312,376 | 3/1943 | Andrew | 475/338 |
| 2,931,252 | 4/1960 | Ferguson et al. | 475/338 |
| 4,142,426 | 3/1979 | Baranyi | 475/338 |
| 4,854,190 | 8/1989 | Won . | |
| 5,376,057 | 12/1994 | Cooper et al. | 475/339 X |
| 5,472,387 | 12/1995 | Kamlukin | 475/338 |
| 5,540,629 | 7/1996 | Gotman | 475/248 |
| 5,540,630 | 7/1996 | Vranish | 475/338 |
| 5,692,989 | 12/1997 | Kamlukin | 475/338 X |
| 5,711,739 | 1/1998 | Hashimoto et al. | 475/338 X |
| 5,759,130 | 6/1998 | Woytaszek | 475/339 |
| 5,762,162 | 6/1998 | Bodtker | 475/339 X |
| 5,879,262 | 3/1999 | Ikeda et al. | 475/248 |

*Primary Examiner*—Khoi Q. Ta
*Attorney, Agent, or Firm*—Law Offices of Royal W. Craig

[57] ABSTRACT

An improved gear transmission is disclosed having a constantly variable mechanical advantage. This is accomplished by providing two transmission paths for power transmission between the input and the output of the transmission. The transmission comprises a gear casing, an input shaft rotatably mounted in one end of the gear casing, and an output shaft rotatably mounted in the other end of the gear casing (coaxial to the input shaft). At least one offset shaft is rotatably mounted in the gear casing parallel to the input and output shafts and spaced therefrom. A first sun gear is mounted on the input shaft, and a second sun gear is mounted on the output shaft. A pair of planetary gears is mounted on the offset shaft, and one engages the first sun gear while the other engages the second sun gear. The above-described sun gears and planetary gears maintain a positive engagement at all times between the input shaft and the output shaft and transmit power from the input shaft along two different paths including through rotation of the gear case and directly to the rotating output shaft. The output shaft torque determines the speed and torque of either, differential route. Alternative embodiments are shown which increase and/or decrease the mechanical advantage.

8 Claims, 6 Drawing Sheets

GEAR TRANSMISSION WITH AUTOMATIC CONTINUOUSLY VARIABLE MECHANICAL ADVANTAGE

BACKGROUND OF THE INVENTION

1. Field of the Invention

The present invention relates to gear-driven transmissions and, more particularly, to an improved transmission having a constantly variable automatic transmission.

2. Description of the Background

Most conventional transmissions are step transmissions that require a shifting of gears to change the mechanical advantage and speed between a input shaft and a output shaft. A typical step transmission in an automobile works by mechanically engaging a gear on the output shaft with gears of various sizes on the input shaft. As larger gears on the input shaft engage the gear on the output shaft the torque and the speed on the output shaft changes. Under these conditions the power between the output shaft and the input shaft remains constant.

Step transmission suffer from the following disadvantages:

(1) A shift in mechanical advantage to change speed results in wasted power.

(2) Driving motors such as A/C motors cannot remain at an optimum power output when the output speed changes. This problem is especially acute with A/C motors because changes in speed cause overheating.

(3) Step transmissions are mechanically complex and difficult to construct. They are heavy and require auxiliary controls. The manufacturing cost is high.

Continuously variable transmissions are a well-known alternative to the step-transmission.

For instance, U.S. Pat. No. 4,854,190 shows a continuously variable transmission with a floating gear assembly that provides a wide range of output speeds and torque. The reference points out that the floating gear assembly rotates in opposite direction to the input shaft. The reference does not show an output power.

It would be greatly advantageous to provide a more economical gear transmission with a constantly variable mechanical advantage. This would allow A/C motors to run at an optimum speed while their connected (driven) appliances could vary in speed.

SUMMARY OF THE INVENTION

It is, therefore, an object of the present invention to provide an improved gear transmission having a constantly variable mechanical advantage.

It is another object to provide an inexpensive continuous transmission which eliminates the complexity and cost of existing step transmission.

It is another object to provide a continuous transmission for A/C motors that allows the motor to run at an optimum speed yet frictionally engages a connected output appliance for operation at variable speed.

In accordance with the above objects, an improved gear transmission is disclosed having a constantly variable mechanical advantage. This is accomplished by providing two transmission paths for power transmission between the input and the output of the transmission. The transmission comprises a gear casing, an input shaft rotatably mounted in one end of the gear casing, and an output shaft rotatably mounted in the other end of the gear casing (coaxial to the input shaft). At least one offset shaft is rotatably mounted in the gear casing parallel to the input and output shafts and spaced therefrom. A first sun gear is mounted on the input shaft, and a second sun gear is mounted on the output shaft. A pair of planetary gears is mounted on the offset shaft, and one engages the first sun gear while the other engages the second sun gear. The above-described sun gears and planetary gears maintain a positive engagement at all times between the input shaft and the output shaft and transmit power from the input shaft along two different paths including through rotation of the gear case and directly to the rotating output shaft.

Additionally, a free-wheeling unit may be added to keep the gear case from turning in reverse of the output shaft. The output shaft torque determines the speed and torque of either differential route. If the output torque is maximum the gear case and output shaft rotate at equal speed. If the output shaft is locked or non-rotatable, then the free-wheeling unit prevents backward rotation of the gear case. The whole system is locked and no power passes. Conversely, if the output shaft runs free, then the gear case rotates and the gear train ceases to rotate. These conditions establish the limits of operation between the gear case and the gear train. Most practical applications will fall between the two limits so that the transmission system is kept constantly in balance with no irregularity in motion.

A second embodiment is disclosed which increases the mechanical advantage of the gear train, entailing an intermediate shaft rotatably connected between the input and output shafts (coaxially thereto), and a series of successive sun gears and planetary gears having first and second gear tracks of different diameters. The successive sun gears and planetary gears maintain a positive engagement at all times between the input shaft, intermediate shaft, and the output shaft and transmit power from the input shaft along two different paths including through rotation of said gear case and through said intermediate shaft to the rotating output shaft.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
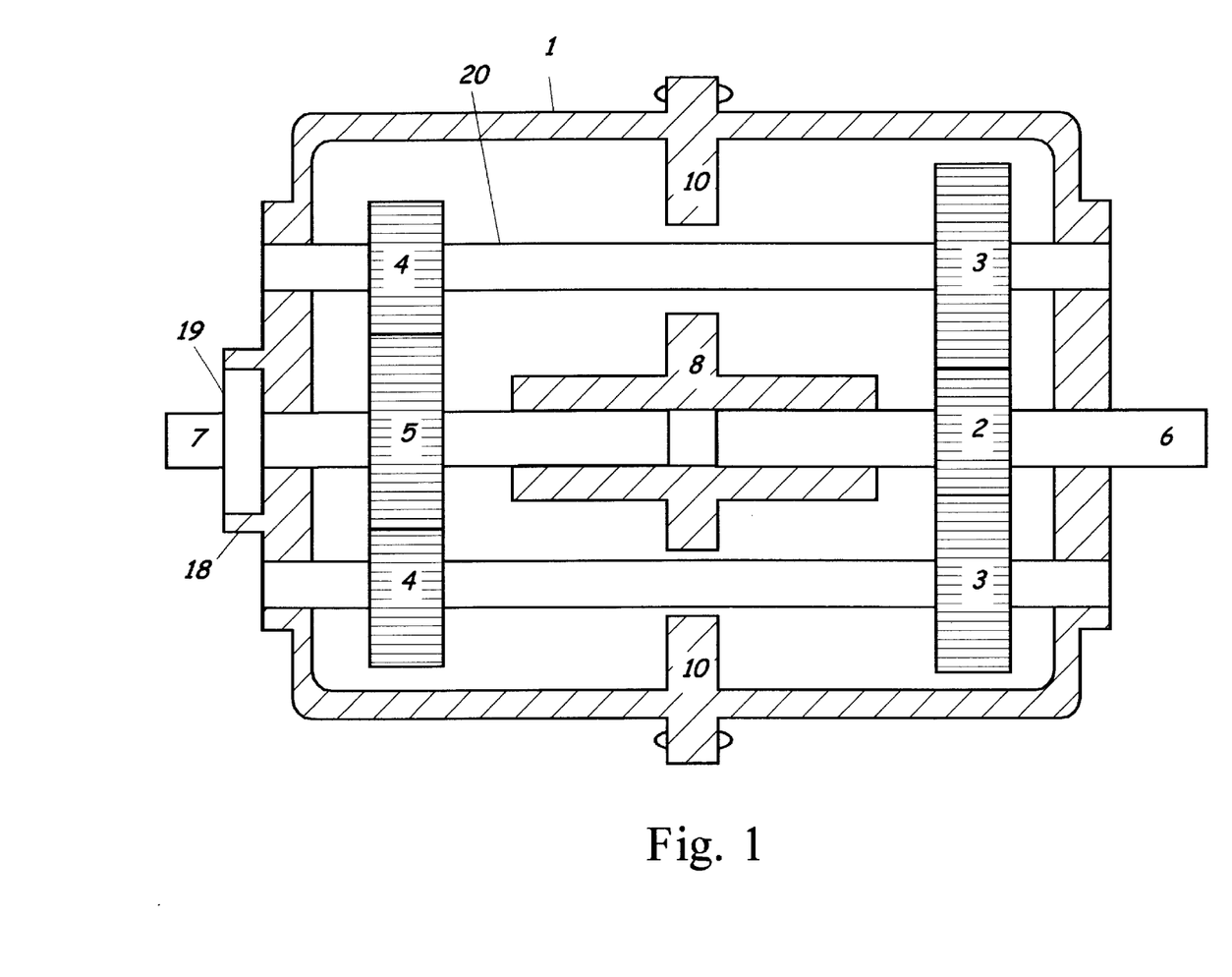
FIG. 1 is a front cross-section of the gear transmission with automatic continuously variable mechanical advantage according to one embodiment of the present invention.

FIG. 1 is a front cross-section of the gear transmission with automatic continuously variable mechanical advantage according to one embodiment of the present invention.

Gear case 1 provides an enclosure for the internal gears and may be formed as shown from two half-sections that are bolted together for ease of construction and assembly. The gear case 1 may serve as an oil reservoir for lubrication.. Gear case 1 remains floating and is free to turn independent of input shaft 6 or output shaft 7.

An input shaft 6 is rotatably mounted through the gear case 1 at one end, preferably with a conventional bushing or the like. Shaft 6 rotates independently of the gear case 1, and a small input sun gear 2 is mounted on the input shaft 6 inside gear case 1.

Likewise, an output shaft 7 is rotatably mounted through the gear case 1 at the other end via a conventional bushing. Shaft 7 rotates independently of the gear case 1, and a larger output sun gear 5 is mounted on the output shaft 7 inside gear case 1.

The input shaft 6 and output shaft 7 are rotatably coupled in the center of the gear case 1 by an alignment sleeve/spacer 8. Alignment sleeve/spacer 8 provides a simple sleeve-type bushing to maintain the input shaft 6 and output shaft 7 in axial alignment. Alignment sleeve/spacer 8 also separates gear shaft 6 and gear shaft 7 within gear case 1 in order to permit the two shafts to turn at different speeds. The alignment sleeve/spacer 8 is preferably rigidly attached to gear case 1, and may be formed integrally therewith as shown. This is best accomplished by mounting or forming the alignment sleeve/spacer 8 at the center of a supporting wall 10.

A conventional free-wheeling unit 19 is mounted externally of gear case 1 and engages output shaft 7. A "free wheeling unit", or over-riding clutch, is a known device to prevent one shaft from turning in the opposite direction of another shaft.

Figure 2:
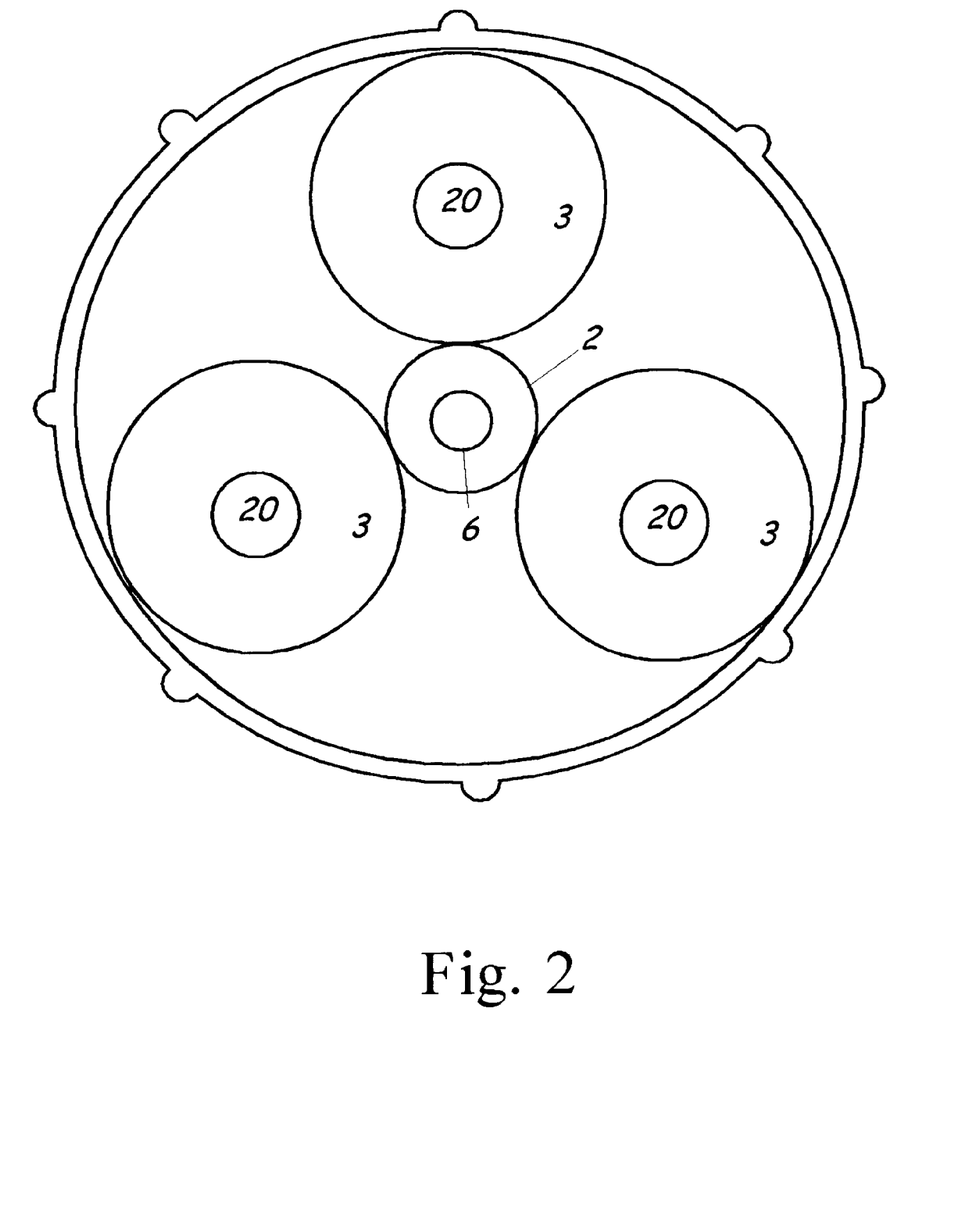
FIG. 2 is a side cross-section of the gear transmission of FIG. 1 that illustrates the relationship between the internal gears of the gear train and gear case.

FIG. 2 is a side cross-section of the gear transmission of FIG. 1 that illustrates the relationship between the internal gears of the gear train and gear case.

Three offset shafts 20 are rotatably mounted through the gear case 1 by conventional bushings at equilateral positions and in parallel with the central input and output shafts 6, 7. The supporting wall 10 is provided with holes and/or bushings to rotatably pass the offset shafts 20. Each offset shaft 20 rotates independently of the gear case 1, and a larger planetary gear 3 is mounted on each offset shaft 20 at the input end and inside gear case 1. All three orbiting planetary gears 3 engage the small input sun gear 2 mounted on the input shaft 6 inside gear case 1. Similarly, a smaller planetary gear 4 is mounted on each offset shaft 20 at the opposing output end and inside gear case 1. All three orbiting planetary gears 4 engage the larger output sun gear 5 mounted on the output shaft 7 inside gear case 1.

The operation of the transmission shown in FIGS. 1 and 2 is best understood from an analysis of the power distribution when input shaft 6 or 14 rotates. When torque is applied to input shaft 6 the power is routed to output shaft 7 via rotation of planetary gears 3 by gear 2. Since planetary gears 3 and 4 are mounted on common shafts 20, the power is transmitted to gear 5 thereby rotating output shaft 7. In addition, power is also routed to gear case 1 via rotation of planetary gears 3 by gear 2. The gear case 1 is free to rotate in the same direction as the input shaft 6, and tends to do so about the input and output shafts 6, 7. Thus, two transmission paths are provided for power transmission between the input and the output of the transmission: (1) through the floating gear case 1, and (2) through the gear train to the rotating output shaft 7.

If output shaft 7 is under no load, gear case 1 can develop a maximum angular velocity (rotation) that is equal to the speed of rotation (angular velocity) of output shaft 7. As a counter-torque or load is gradually applied to output shaft 7 the distribution of power shifts to planetary gears 4 and 5. This decreases the power routed to the gear case 1 and results in a reduction in angular velocity of the gear case. If the counter torque or load is strong enough the angular velocity of the gear case 1 can approach a speed equal to output shaft 7. Free-wheeling unit 19 (described with respect to FIG. 3) is provided to keep the gear case 1 from actually turning in reverse of the output shaft 7. This would otherwise occur if the output load were infinite (and the output shaft were prevented from turning). There would no longer be any transfer of power despite an input torque because the gear case 1 would spin futilely in the reverse direction. The free-wheeling unit 19 corrects this condition and output speed becomes zero.

If the planetary gears 3 and 4 are locked and cannot turn, then gear case 1 and the output shaft and input shaft 7, 6 all turn at the same speed. Locking the gears 3, 4 causes shafts 20 to orbit thereby rotating gear 5 at the same speed as the input shaft 6 and the gear case 1.

At all times the distribution of power between the gear case 1 and output shaft 7 seeks a balance. As the torque on the output shaft 7 and the gear case 1 approach the torque on the input shaft 6 the output speed approaches the input speed. This means that speed and torque may change constantly on the output shaft 7 but the product power is approximately equal. The above-described use of an independent or floating gear case 1 illustrates the power transmission across two paths with a mechanical advantage in one path.

Figure 3:
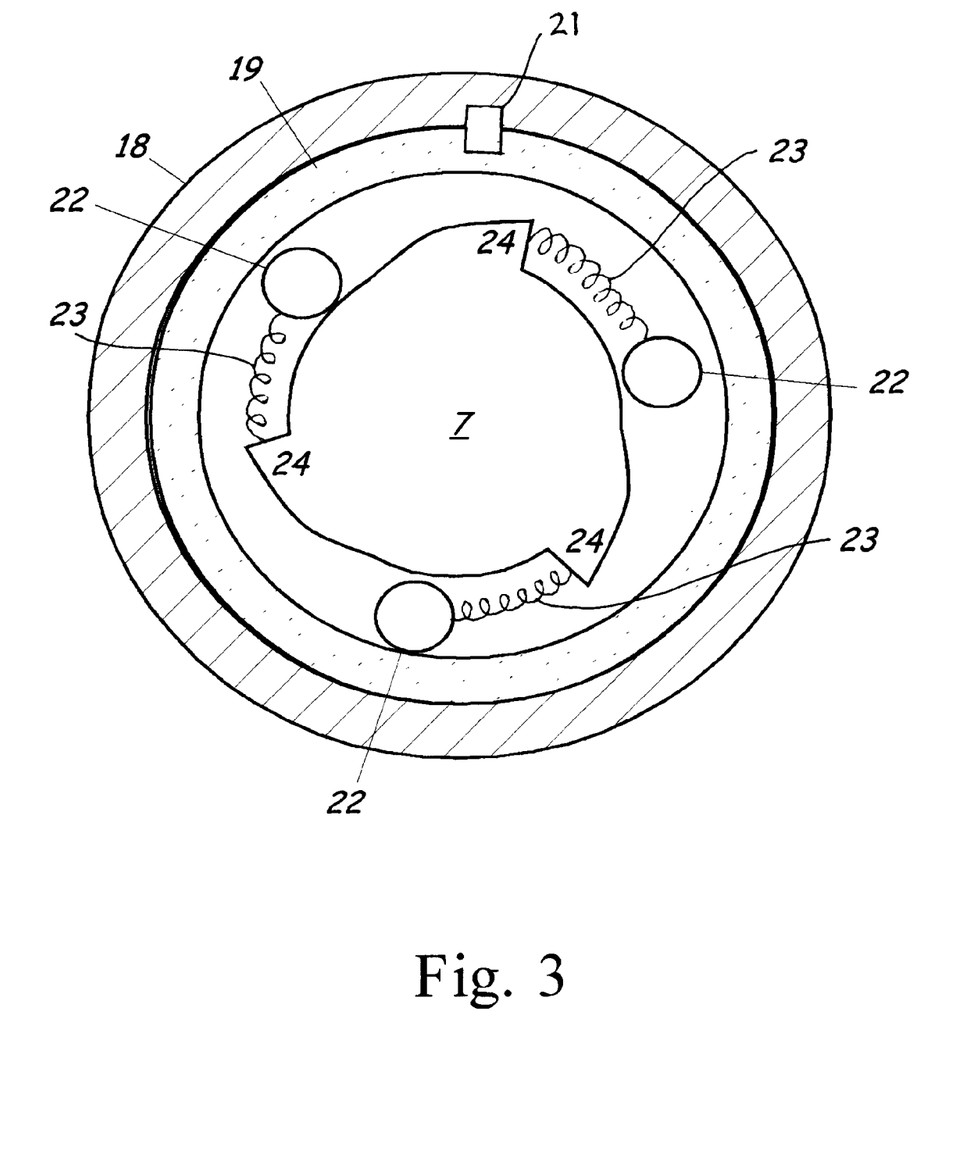
FIG. 3 is a cross-sectional drawing of an exemplary free-wheeling unit 19 that is suitable for use in the transmission of the present invention.

FIG. 3 is a cross-sectional drawing of an exemplary free-wheeling unit that is suitable for use in the transmission described above. The gear case 1 is equipped with a collar 18 that is mounted externally thereon so as to protrude coaxially around output shaft 7. A hollow cylindrical free-wheeling unit housing 19 is lock mounted by a lock key 21 inside gear case collar 18. The output shaft 7 protrudes coaxially and centrally into the free-wheeling unit housing 19, and the protruding end of output shaft 7 is equipped with ramped ball checks 24. Each ball check 24 is simply a ramped bearing surface gradually leading away from output shaft 7 and terminating at an abrupt angle. The ball checks 24 may be integrally formed with output shaft 7. In addition, springs 23 are attached within the inner surface of housing 19 at equilateral positions. The ball bearings 22 are attached to the free ends of springs 23, the other ends of springs 23 being attached to the ends of the ramped ball checks 24 as shown. Ball bearings 22 are free to ride up and down ramped ball checks 24.

When the output shaft 7 turns clockwise, the ball bearings 22 retract off of ball checks 24 and friction is reduced, thereby permitting the output shaft 7 to turn freely. On the other hand, when the output shaft 7 turns counter-clockwise the ball bearings 22 climb ball checks 24 and friction is increased, thereby obstructing the output shaft 7 and forcing the output shaft 7 and gear case 1 to rotate in the same direction.

Figure 4:
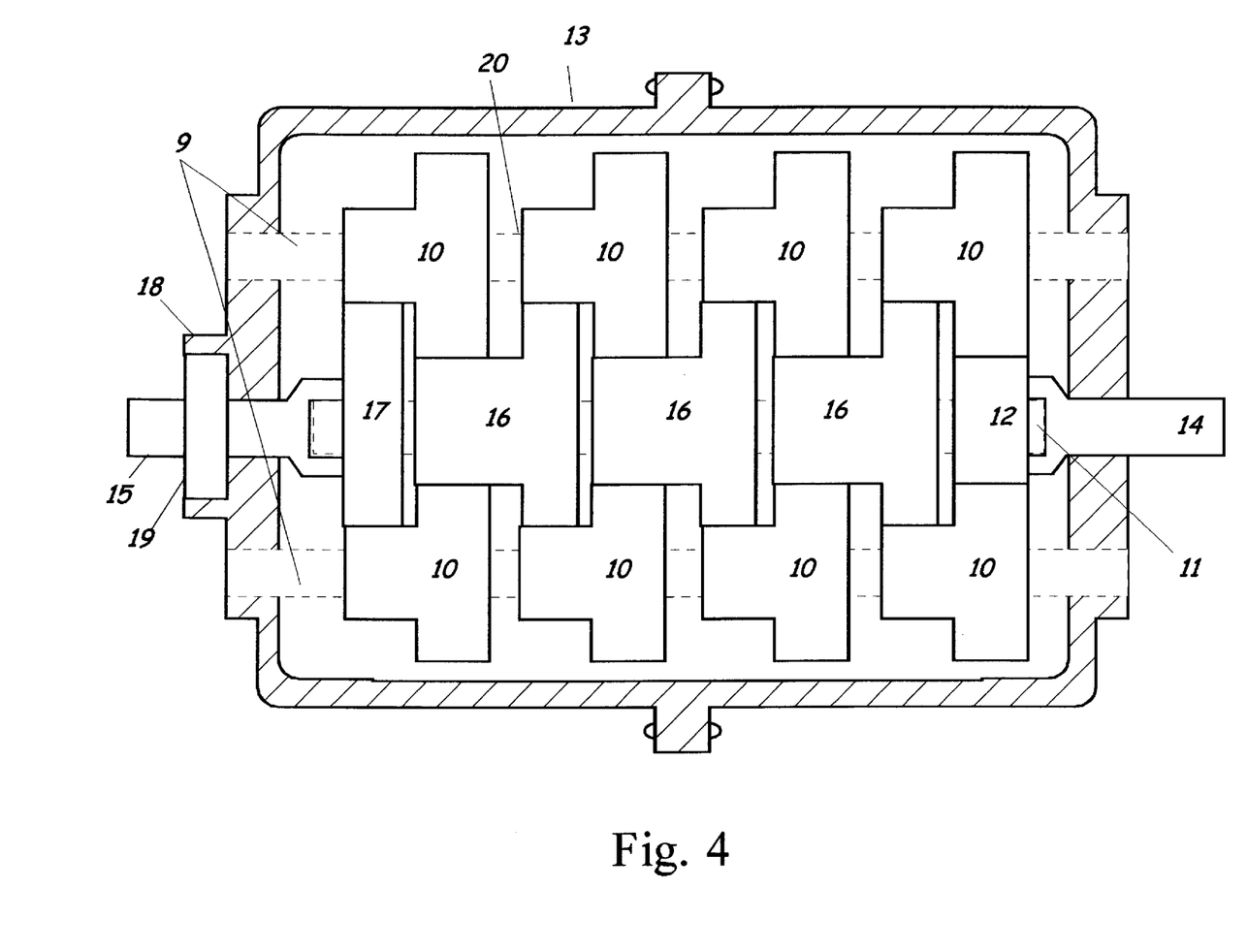
FIG. 4 is a cross-section of a reduction gear with automatic continuously greater, or increased variable mechanical advantage according to a second embodiment of the present invention.

FIG. 4 is a cross-section of a reduction gear with automatic continuously variable mechanical advantage according to a second embodiment of the present invention. The gearing consists of a series of sun gears and planetary gears similar to those of FIG. 1. More specifically, three equilateral line shafts 9 are mounted in gear case 13. Line shafts 9 are solidly fixed in gear case 13. A succession of planetary gears 10 are mounted on each line shaft 9. The planetary gears 10 are free to rotate on shafts 9. As before, the transmission employs three line shafts 9 in gear case 13, all being equally spaced about a central shaft 11. A power input shaft 14 and output shaft 15 are rotatably mounted through gear case 13 at opposing ends. A smaller sun gear 12 is mounted on the input shaft 14 inside of housing 13, and a larger sun gear 17 is mounted on the output shaft 15 inside of housing 13. Sun gears 12, 17 at each end of the gear case have central holes which hold central line shaft 11 in position. Central line shaft 11 is free to rotate independently of sun gears 12, 17. A preferred way to achieve independent rotation of central shaft 11 is to recess a bearing or bushing in the central holes in sun gears 12 and 17, between sun gears 12, 17 and central shaft 11. A succession of intermediate sun gears 16 are mounted along central line shaft 11 and are free to rotate independently of central line shaft 11. The sun gears 16 each correspond to a planetary gear 10, and all of the sun gears 16 and planetary gears 10 are formed with two sets of gear teeth of two different diameters. Thus, each sun gear 16 and corresponding planetary gear 10 have two engaged gear tracks of different diameters (the two connected gear tracks having at least one large gear and at least one small gear). The small gear track on each planetary gear 10 drives the next succeeding large gear on the central shaft 11 to gain mechanical advantage. By selecting the size of the planetary gears 10 and sun gears 16 different advantages can be achieved.

For example, if a reduction between mating gears 10 and 16 has a ratio of 2:1, then the entire illustrated system has a ratio of 256:1 between input shaft 14 and output shaft 15.

Operation of the transmission of FIG. 4 is identical to that of FIG. 1. The same above-described free-wheeling unit 19 is incorporated for the same reasons, and the output power is always equal to input power.

Figure 5:
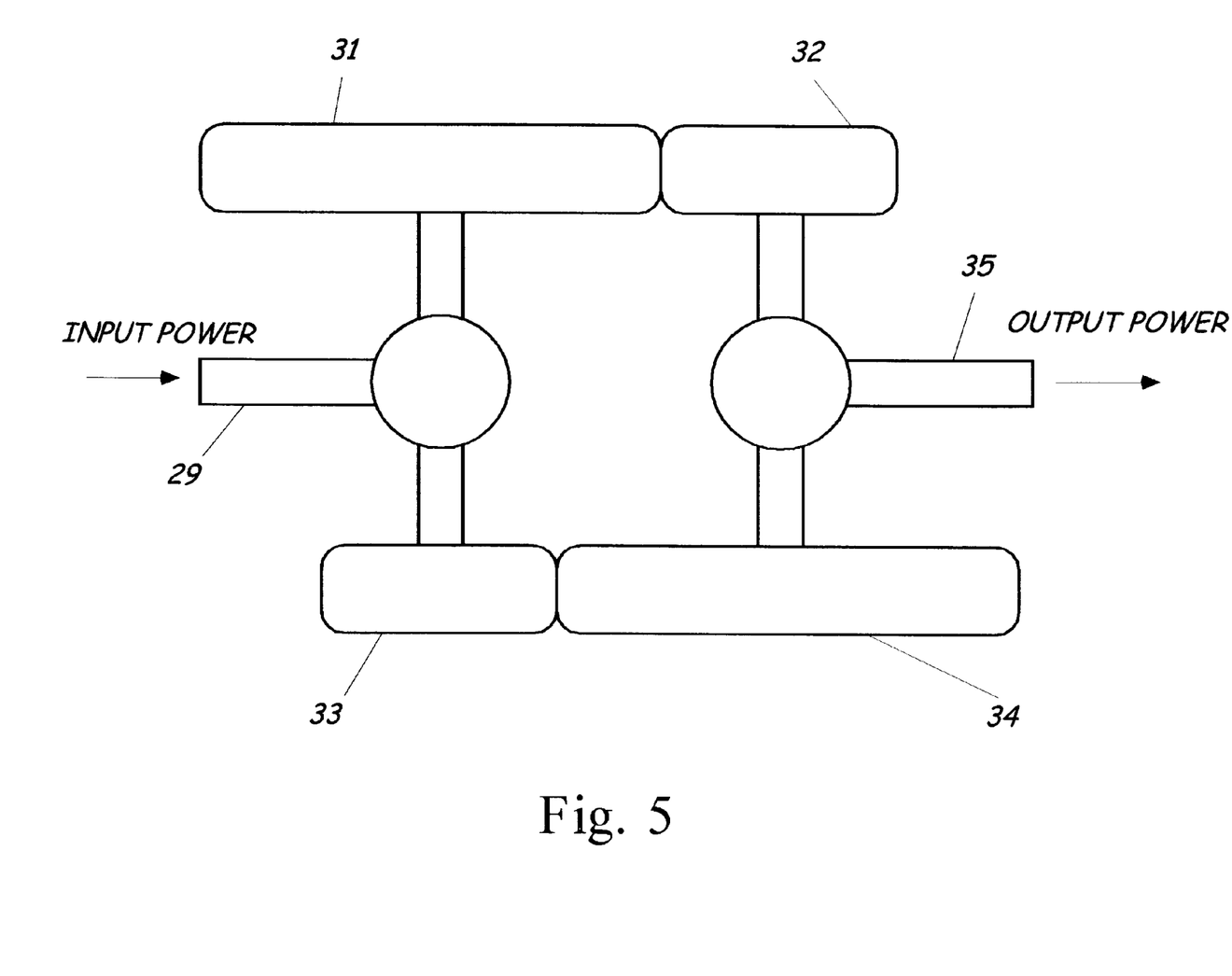
FIG. 5 shows two differential transmissions connected together in an opposing manner for a vehicle. This illustrates the principle of two differential routes of power transmission.

FIG. 5 shows two differential transmissions connected together in an opposing manner for a vehicle. The two automobile differentials are connected together with wheels or gears 31, 32, and 33, 34 making driving contact with each other. Motive power can be transmitted either by the upper wheels 31, 32, lower wheels 33, 34, or both sets of wheels simultaneously. A mechanical advantage can be established by making one wheel 31 or 33 larger than its engaging wheel 32 or 34, respectively. The transmission of torque and speed the input shaft 29 to output shaft 35 depends on the transmission path taken. Wheels 31 and 32 provide an increase in speed with a decrease in torque. Wheels 33 and 34 provide a decrease in speed and increase in torque. Since wheel 31 is larger than wheel 32, the rotation of wheel 32 has to be greater than wheel 31 when wheel 31 is driven by input shaft 29. Likewise, wheel 34 must rotate slower than wheel 33 because wheel 33 is smaller than wheel 34.

In operation, an automobile moving up a hill would require an increase in torque on the output shaft 35. Under this condition all power would begin to be routed through wheels 33 and 34 thereby decreasing velocity and increasing torque on the output shaft. The power transmitted to wheels 31 and 32 would begin to decrease until the velocity is reduced to zero. On downgrade when the velocity of the automobile is faster than the velocity of the input shaft 29 the transmission begins to work in reverse. The mechanical advantage begins to shift to the upper wheels 31 and 32. Since upper wheel 32 is smaller than wheel 34 and has less torque, it is able to increase in velocity while wheel 34, having more resistance to rotation, will decreases in velocity. At intermediate speeds and under no load all the wheels 31–34 turn. As speed approaches maximum the power is routed to the wheels 31 and 32. Wheel 33 begins to approach zero velocity while wheel 31 approaches the velocity of the input shaft. During all conditions or any speed the input power of transmission is approximately equal to the output power. By establishing two routes of power with at least one mechanical advantage between the input and output shaft, any unbalanced forces are free to complete a circuit so that the wheels establish a new equilibrium wherein overall power input approaches overall power output. Mathematically, a power equilibrium exists when the input speed times input torque equals output speed times output torque.[1]

[1] Although "equal" is used freely in the specification, there are always friction losses in all transmissions. Therefore equal should be interpreted as approximately equal.

Figure 6:
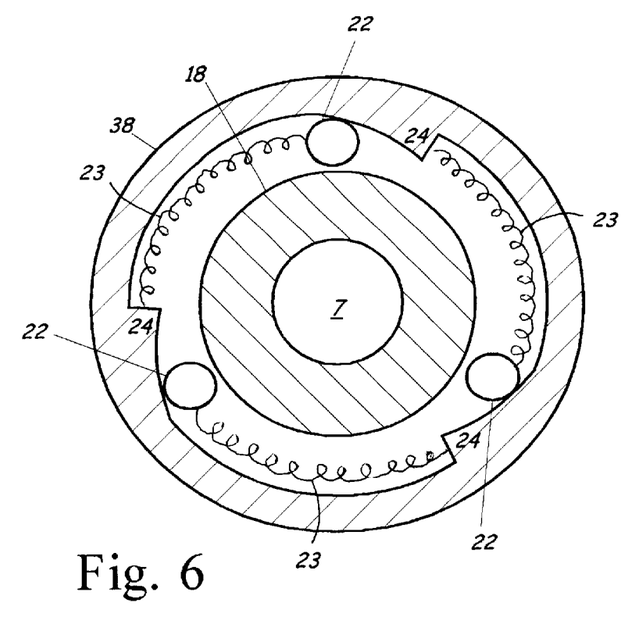
FIG. 6 is a front view of an alternative arrangement of a free-wheeling unit similar to FIG. 3 except with slight modifications for use in the transmission described above.

FIG. 6 is a front view of an alternative arrangement of a free-wheeling unit similar to FIG. 3 except with slight modifications for use in the transmissions described above. The modified free-wheeling unit is also suitable for use in either of the transmission embodiments shown in FIGS. 1 or 4. More specifically, the modified free-wheeling unit is coupled between the vehicle frame and gear case collar 18, rather than between the gear case collar 18 and output shaft 7 as in FIG. 3. To accomplish this, the gear case collar 18 of transmission gear case 1, 13 is formed as a sleeve around output shaft 7, the external surface of gear case collar 18 serving as a bearing surface. In addition, the vehicle frame (not shown) is equipped with a drum 38 that is mounted externally thereon so as to protrude coaxially around the bearing surface 18 and output shaft 7, 15. Drum 38 is welded or otherwise securely attached to the vehicle frame.

Figure 7:
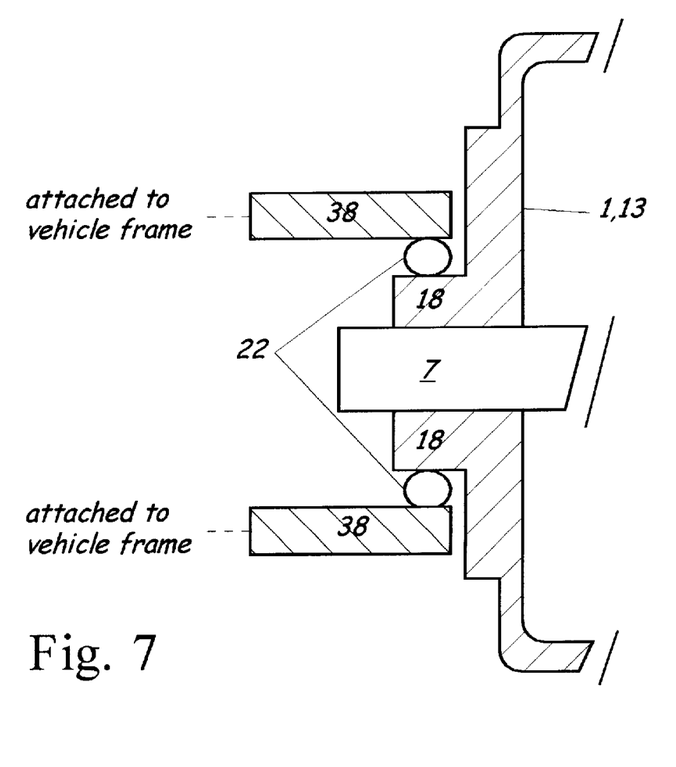
FIG. 7 is a side-cross-section of the modified free-wheeling unit illustrating the drum 38 that is anchored directly to the vehicle frame to protrude coaxially around the gear case collar 18 and output shaft 7.

FIG. 7 is a side-cross-section of the modified free-wheeling unit illustrating the drum 38 that is anchored directly to the vehicle frame to protrude coaxially around the gear case collar 18 and output shaft 7. With reference to FIGS. 6 and 7, the cylindrical gear case collar 18 is positioned inside drum 38. The output shaft 7 protrudes coaxially, centrally and rotatably into the gear case collar 18 both within the vehicle frame drum 38. As before, ramped ball checks 24 are provided within a spacing between the inner circumference of the vehicle frame drum 38 and the outside of the gear case collar 18. Again, each ball check 24 is simply a ramped bearing surface gradually leading away from vehicle frame drum 38 and terminating at an abrupt angle. The ball checks 24 may be integrally formed with vehicle frame drum 38. The springs 23 are attached within the inner surface of vehicle frame drum 38 (preferably to the terminations of the ball checks 24) and between the gear case collar 18. The three ball bearings 22 are attached to the free ends of springs 23, the other ends of springs 23 being attached to or near the ends of the ramped ball checks 24 as shown. Ball bearings 22 are free to ride up and down ramped ball checks 24.

The operation of the modified free-wheeling unit is similar to that of FIG. 3, except that they inhibit rotation of the gear case 1, 13 via gear case collar 18. When the gear case collar 18 turns counter-clockwise, the ball bearings 22 retract off of ball checks 24 and friction is reduced, thereby permitting the gear case collar 18 and gear case 1, 13 to turn freely. On the other hand, when the gear case collar 18 turns clockwise the ball bearings 22 climb ball checks 24 and friction is increased, thereby obstructing rotation of the gear case collar 18 and gear case 1, 13 and forcing the gear case collar 18 and gear case 1, 13 to rotate in the same direction.

The net effect may be contrasted to the free-wheeling unit of FIG. 3 in which the free-wheeling unit is referenced to the output shaft 7. In such case there is no mechanical advantage in the last gear coupling. In other words, with reference to FIG. 4, the maximum mechanical advantage is 128:1 using the free-wheeling unit of FIG. 3. However, using the modified free-wheeling unit of FIGS. 6 and 7 in which the coupling is directly to the vehicle frame rather than the output shaft 7, all power passes through the gear train under full-load and the velocity of the gear case 1, 13 is zero. Thus, if the gear case 1, 13 is locked so that it cannot turn, then all power goes through the gear train with the mechanical advantage established entirely by the size of the planetary gears. Thus, there is a gain in mechanical advantage from the last gear coupling and the maximum mechanical advantage (with reference to FIG. 4) rises to 256:1.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically claimed herein.

I claim:

1. A gear transmission with a constantly variable mechanical advantage between an input shaft and an output shaft, comprising:

a gear casing;

an input shaft rotatably mounted in one end of said gear casing;

an output shaft rotatably mounted in another end of said gear casing coaxial to said input shaft;

at least one offset shaft rotatably mounted in said gear casing parallel to said input and output shafts and spaced therefrom;

a first sun gear mounted on said input shaft;

a second sun gear mounted on said output shaft;

a pair of planetary gears mounted n said offset shaft, one of said planetary gears engaging said first sun gear and the other of said planetary gears engaging said second sun gear, wherein said sun gears and planetary gears maintain a positive engagement at all times between the input shaft and the output shaft and transmits power from the input shaft along two different paths including through rotation of said gear case and directly to the rotating output shaft.

2. A gear transmission according to claim 1, wherein said at least one offset shaft further comprises three equilateral offset shafts rotatably mounted in said gear casing parallel to said input and output shafts and spaced therefrom, a pair of said planetary gears being mounted on each of said offset shafts.

3. A gear transmission according to claim 1, wherein said gear case rotates on the input and output shafts independent of rotation of the input and output shafts.

4. A gear transmission according to claim 1, further comprising a free-wheeling unit to keep the gear case from turning in reverse of the vehicle frame.

5. A gear transmission according to claim 1, wherein said planetary gears are rigidly attached to the offset shaft.

6. A gear transmission according to claim 1, wherein said planetary gears are not rigidly attached to the offset shaft and are free to rotate thereabout.

7. A gear transmission according to claim 1 wherein speed and torque can change constantly from the input shaft to the output shaft with the overall input power approximately equal to the overall output power.

8. A gear transmission with a constantly variable mechanical advantage between an input shaft and an output shaft, comprising:

a gear casing;

an input shaft rotatably mounted in one end of said gear casing;

an output shaft rotatably mounted in another end of said gear casing coaxial to said input shaft;

an intermediate shaft rotatably connected between said input and output shafts coaxially thereto;

at least one offset shaft rotatably mounted in said gear casing parallel to said input, output and intermediate shafts and spaced therefrom;

a first sun gear mounted on said input shaft;

a second sun gear mounted on said output shaft;

at least two planetary gears mounted on said offset shaft, each offset planetary gear having first and second gear tracks of different diameters, the first gear track of one planetary gear engaging said first sun gear and the second gear track of the other planetary gear engaging the second sun gear;

at least one sun gear mounted on said intermediate shaft, said intermediate sun gear having first and second gear tracks of different diameters, the first intermediate gear track engaging the second gear track of said one offset planetary gear and the second intermediate gear track engaging the first gear track of said other offset planetary gear;

wherein said sun gears and planetary gears maintain a positive engagement at all times between the input shaft, intermediate shaft, and the output shaft and transmit power from the input shaft along two different paths including through rotation of said gear case and through said sun gear mounted on said intermediate shaft to the rotating output shaft.

* * * * *